(12) United States Patent
Robbie et al.

(10) Patent No.: US 6,688,128 B1
(45) Date of Patent: Feb. 10, 2004

(54) MATERIAL FOR THE CONTROLLED VAPORIZATION OF A LIQUID CRYOGEN

(75) Inventors: Mark John Robbie, Livingston (GB); David Myers, Camp Verde, AZ (US)

(73) Assignees: Gore Enterprise Holdings, Inc, Newark, DE (US); W. L. Gore & Associates (UK) Ltd., Livingston (GB)

( * ) Notice: Subject to any disclaimer, the term of this patent is extended or adjusted under 35 U.S.C. 154(b) by 0 days.

(21) Appl. No.: 10/193,535

(22) Filed: Jul. 11, 2002

Related U.S. Application Data

(62) Division of application No. 09/327,808, filed on Jun. 8, 1999, now Pat. No. 6,427,451.

(51) Int. Cl.$^7$ .............................................. F25D 23/12
(52) U.S. Cl. ...................................... 62/259.3; 165/46
(58) Field of Search .................. 62/50.7, 259.3; 165/46

(56) References Cited

U.S. PATENT DOCUMENTS

| | | | |
|---|---|---|---|
| 2,969,092 A | 1/1961 | Johnston | 62/50.7 |
| 3,206,939 A | 9/1965 | Wilson | 62/50.7 |
| 3,295,563 A | 1/1967 | Laya et al. | 62/50.7 |
| 3,699,775 A | 10/1972 | Cowans | 62/50.7 |
| 3,777,501 A | 12/1973 | Sharp et al. | 62/50.7 |
| 4,571,954 A | 2/1986 | Roberts | 62/514 R |
| 4,738,119 A | 4/1988 | Zaffred | 62/259.3 |
| 4,745,760 A | 5/1988 | Porter | 62/55 |
| 5,400,602 A | 3/1995 | Chang et al. | 62/50.7 |
| 5,511,542 A | 4/1996 | Hall | 128/201.21 |
| 5,520,682 A | 5/1996 | Baust et al. | 606/24 |
| 5,946,931 A | 9/1999 | Lomax et al. | 62/304 |

*Primary Examiner*—Ronald Capossela
(74) *Attorney, Agent, or Firm*—Carol A. Lewis White

(57) ABSTRACT

A shaped article is capable of at least one of containing and delivering a cryogenic fluid. The article has a porous structure that restricts the passage of cryogenic fluid in the liquid phase while permitting the passage of cryogenic fluid in the gaseous phase. The article may be in the form of a tube or container. The article permits a liquid cryogen to be transported to a specific site, and then cool the site by means of conduction from the cold article and convection of cold gas, the phase change of the evaporating liquid greatly enhancing the heat loss.

40 Claims, 14 Drawing Sheets

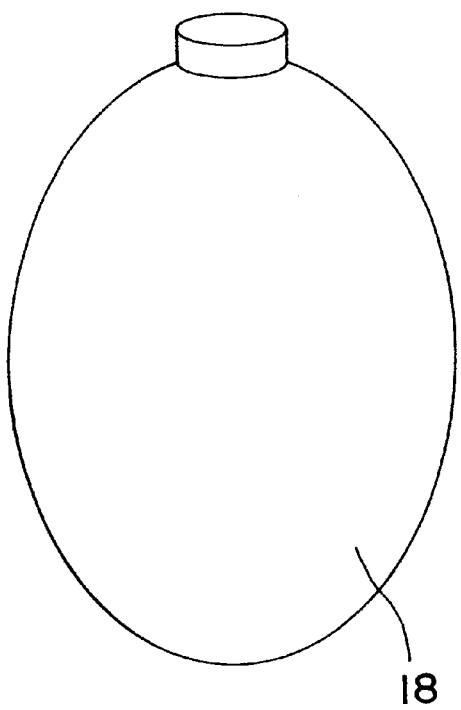
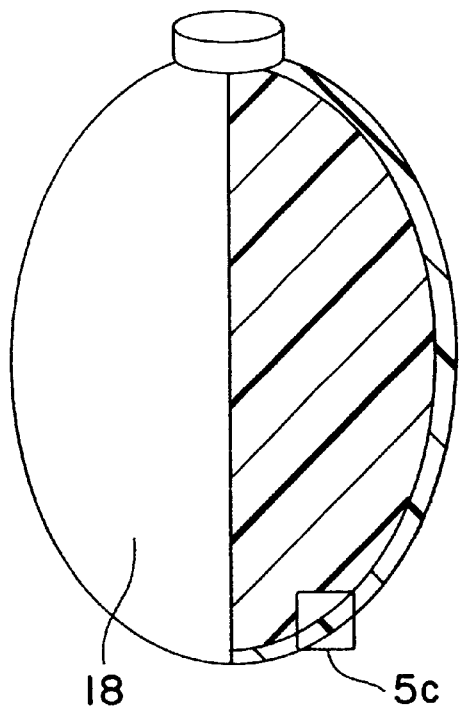
FIG. 5a    FIG. 5b
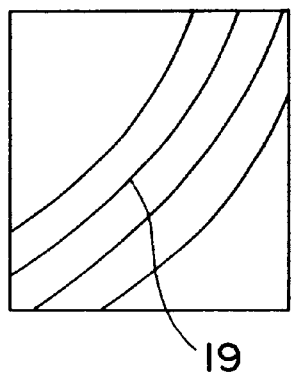
FIG. 5c

SEM 1061-85-1 X SECTION

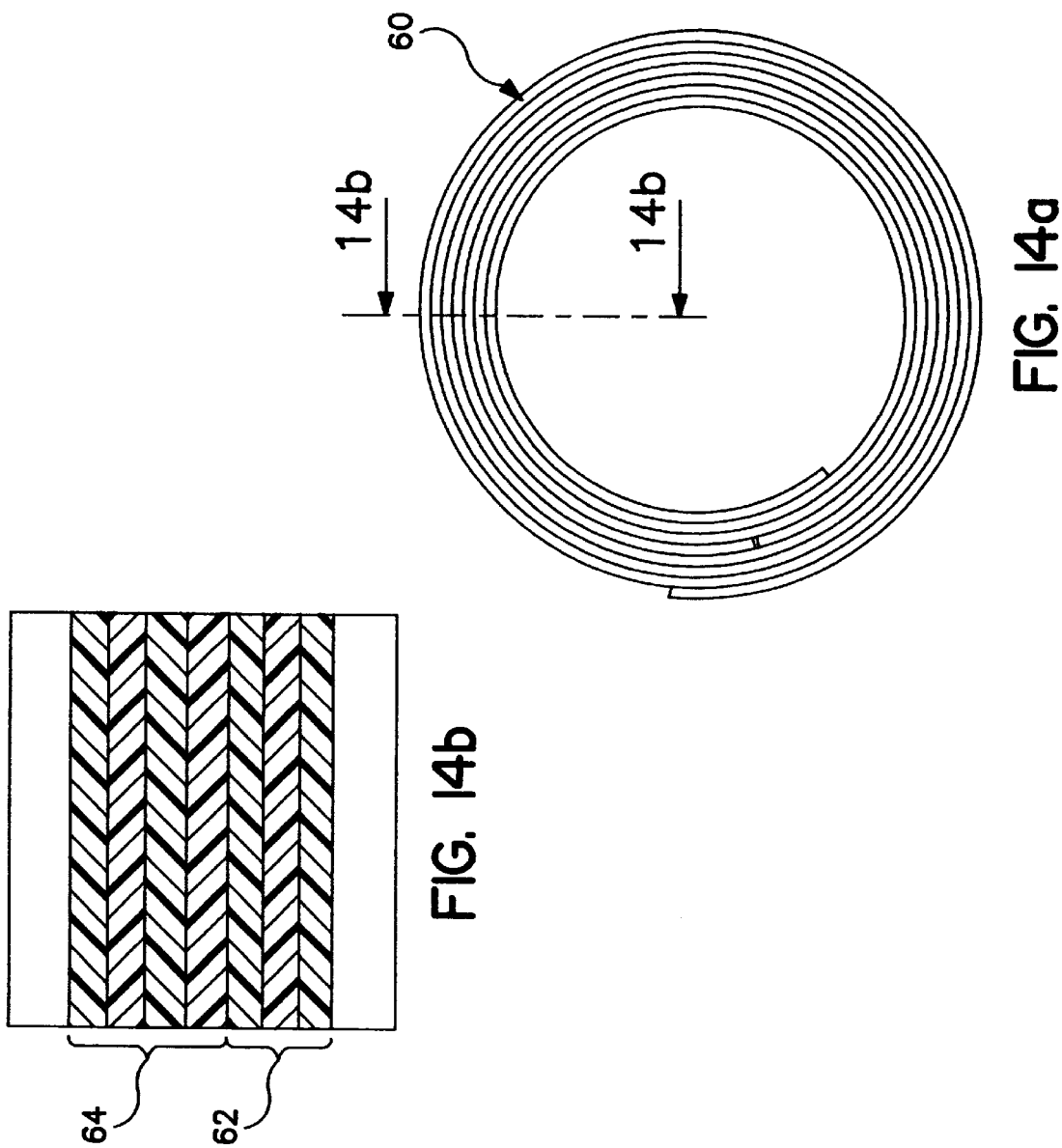

MATERIAL FOR THE CONTROLLED VAPORIZATION OF A LIQUID CRYOGEN

RELATED APPLICATIONS

This application is a divisional of application Ser. No. 09/327,808, filed Jun. 8, 1999 now U.S. Pat. No. 6,427,451.

FIELD OF THE INVENTION

The present invention relates to a material used to facilitate the delivery and controlled evaporation of a liquid cryogen. Shaped articles of the present invention are capable of containing and delivering a cryogenic fluid. These articles have a porous structure that restricts the passage of cryogenic fluid in the liquid phase while permitting the passage of cryogenic fluid in the gaseous phase. Such fluids may include nitrogen, helium, hydrogen, argon, neon and air as well as liquefied petroleum gas or low temperature liquids.

By "restrict" or "restriction" in this context is meant that while gas can exit a material of the present invention through its exterior surface, liquid will enter into the thickness of the material but will not pass as a liquid through its exterior surface under specific operating conditions (e.g., temperature, humidity, pressure, etc.).

By "low temperature" in this context is meant a temperature substantially below 0° C. Typically liquid nitrogen, for example, is liquid at temperature of approximately 77 Kelvin (−196° C.) at an atmospheric pressure of one atmosphere.

BACKGROUND OF THE INVENTION

Two primary technologies are used for the transport or storage of cold liquids or liquids with a low heat of vaporisation, namely, those utilising vacuum insulation and those that operate by dry gas retention. Unlike articles of the present invention, neither of these technologies controls the release of gaseous cryogenic fluid through the exterior surface of the container or conduit.

U.S. Pat. No. 5,511,542 (Westinghouse Electric Corporation) discloses a garment incorporating a conduit constituted by, for example, a Dacron® tube surrounded by a sheath of non-woven cotton. The conduit is stated to be impermeable to liquids but permeable to gases. A conduit of this nature is unlike conduits in accordance with embodiments of the present invention. Cryogenic liquids enter the structure of conduits of the present invention and at high enough pressures liquid cryogens leak through the conduit walls. At pressures lower than those that cause liquid leakage through the walls, cryogenic fluid in the gaseous phase exits the exterior surface of the conduit as evidenced by a plume of water condensate.

Cooling garments, such as the Cooling Suit supplied by Aerospace Design and Development, Inc. Niwot, Colo., as part of the SCAMP® (supercritical air mobility pack) model number 547-000-06 require the use of a coolant that primarily remains in a liquid phase. These garments require a fluid control and heat exchange system, which is heavy. In addition to the extra weight to be carried, such a system has the significant disadvantages of high purchase and service costs. Cooling garments of the present invention possess advantages over cooling garments in the prior art. These advantages include lower weight, lower volumes of liquid coolant used, simpler system control requirements and no need for pumps or fans and their associated power and control requirements.

Various polymers are known to be useful under low temperature conditions such as 77 Kelvin. For example, porous polytetrafluoroethylene (PTFE) is known to retain strength and flexibility at low temperatures, particularly in the form of porous expanded PTFE (ePTFE) constituted by nodes interconnected by fibrils as described in U.S. Pat. No. 3,953,566 to Gore. Such ePTFE, however, is not normally suitable for the transport or storage of cryogenic liquids because of its porosity, which allows cryogenic liquids to have ready passage into and through the ePTFE material.

Temperature gradients affecting materials used in systems such as those involving cryogens are such that thermal expansion and contraction effects cause early mechanical failure in components. Preferred embodiments of this invention, in addition to possessing certain permeation characteristics, relate to materials that retain flexibility and strength at low temperatures, typically 77 Kelvin.

SUMMARY OF THE INVENTION

According to one aspect of the present invention, there is provided a material for the transport of a cryogenic fluid, said material having a porous structure which allows a liquid cryogenic fluid to enter through a first surface of the material into the thickness of the material but restricts leakage of liquid cryogenic fluid through the exterior, or second, surface. The first and second surfaces are separated by the thickness. The restriction may occur within the thickness of the material and/or at the exterior surface at the first and/or or interior surface. Furthermore, the material preferably also controls passage of the cryogenic fluid in gaseous phase through the exterior surface of the material.

In its preferred form, the invention provides a liquid permeation restriction material that preferably is lightweight and flexible at low temperatures. It allows evaporative cooling using liquid cryogenic fluids, which affords more efficient cooling than by simply transporting and delivering a gaseous cryogenic fluid. Articles formed of material of embodiments of the present invention afford the ability to transport a liquid cryogen to a specific site, then cool that site by means of conduction from the cold material and convection of a cold gas. The heat loss is greatly enhanced by the phase change of the evaporating liquid.

According to a further aspect of the present invention there is provided a garment incorporating a conduit of a material with permeation qualities as set out in the preceding paragraphs.

Preferably, the material of the present invention is in the form of a tube.

Preferably also, a plurality of layers of material are superimposed on each other to provide a multi-layered composite material possessing a spiral-shaped cross-section, formed from one or more sheets of film. Furthermore, a tube possessing a spiral-shaped cross-section may be comprised of more than one type of film.

The porous material of the invention results in a product which preferably has a high restriction to the through flow of liquid through the wall of the material whilst having a low content of solid material. This preferred material provides improved mechanical and permeation characteristics particularly when used in a multi-layered construction. A multi-layered construction may result in an article that exhibits low bending stresses, thereby increasing its fatigue life. The summation of several layers of material may also increase the pressure required to force liquid cryogen through to the exterior surface.

The material of the present invention may be utilised to restrict liquid cryogen permeation through the material to a rate that will facilitate heat loss through liquid to vapour phase change within the material and at the external surface of the material.

Cryogenic fluid permeation articles made from material of the present invention enable the passage of the gaseous phase of cryogenic fluids across the thickness direction of the article, while inhibiting the passage of the liquid phase of the fluids across the thickness direction. In these articles, the mass flow rate of the liquid phase of a cryogenic fluid flowing through the wall in the thickness direction is less than or equal to the mass evaporation rate of the liquid at the outer wall surface. The material may be modified to alter the restriction of liquid phase cryogenic fluid passage and the controlled release of gaseous phase cryogenic fluid through the exterior of the material. A preferred article in the form of a cryogenic fluid permeation tube has a liquid nitrogen leak pressure (LNLP) (based on the test described below) of at least 0.3 psi (0.002 MPa). Such a tube performs satisfactorily in a cryogenic cooling garment, tested in a manner described below. The tube does not leak liquid nitrogen during the 15 minute test duration. Tubes preferred for use in a cryogenic cooling garment possess a LNLP of at least 0.3 psi (0.002 MPa) and do not fracture during flexure at cryogenic temperatures. Tubes having higher values for LNLP and that do not fracture at these temperatures are more preferred for use in this application; a more preferable tube for use in a cooling garment possesses a liquid nitrogen leak pressure (LNLP) such as 0.45 psi (0.003 MPa).

Any suitable porous material may be used, including polymers, metals, ceramics and mixtures or composites thereof. Fluoropolymer is considered suitable and porous expanded PTFE (ePTFE) is a particularly preferred material because of its flexibility at cryogenic temperatures and the ability to fabricate a tube and other forms from ePTFE with a desired permeability. Although ePTFE is not brittle at very low temperatures, care must be taken in the construction of tubes, and other forms, to ensure that the structure or density of the final tube does not lead to fracture at these temperatures. Non-porous tubes not only typically possess extremely poor permeation properties, they also tend to be unacceptably stiff and prone to fracture, especially at cryogenic temperatures. Low porosity tubes also appear prone to fracture at cryogenic temperatures.

PTFE-based articles of embodiments of the present invention are also preferred because of the low thermal conductivity of PTFE, which is about 0.232 Watts/m.K. Porous articles of PFTE exhibit even lower thermal conductivity. The use of low thermal conductivity materials may result in safer articles with regard to issues such as potential for cold burns. Cryogenic fluid systems will benefit from lower thermal energy ingress and resulting reduction in gas generation within the fluid transport lines. PTFE additionally has a low heat capacity,1047 kJ/kg K.

The choice of precursor ePTFE film material is a function of the desired number of layers in the final tube, tube wall thickness, air permeability and pore size of the final tube. Pore size may be assessed by isopropanol bubble points (IBP) measurements. Films possessing high IBP values appear to produce final tubes with higher values for LNLP. The use of smaller pore size films appears to increase the LNLP of the final tube. Increased number of layers and increased film thickness may also increase the LNLP of the final tube. The number of layers is preferably between 8 and 48, more preferably between 12 and 24. The LNLP is preferably between 0.003 and 0.075 MPa, more preferably between 0.04 and 0.06 MPa. An ePTFE base tube may also be part of the construction, but the inclusion of a base tube appears not to be critically important. A suitable tube has been constructed using a porous ePTFE film possessing a thickness of 0.0035 inch (0.09 mm), a 39.5 Gurley number and 48.5 psi (0.334 MPa) IBP.

Externally applied reinforcement in the form of rings or helically applied beading or filament or other configurations or materials may be incorporated into the tube construction in order to provide kink and/or compression resistance to the article.

An article in accordance with an aspect of the invention in the form of a membrane suitable for allowing the passage of the gaseous phase of a cryogenic fluid while restricting the passage of the liquid phase of the same cryogen may be produced by a similar process. Multiple layers of film may be wrapped onto a large diameter mandrel, the ends restrained and the assembly placed in an oven in order to bond the layers together using the films and process temperatures described in the examples below. The large diameter tube thus produced may be slit longitudinally to provide a flat membrane. Other techniques may be employed to bond film layers to produce a membrane. The resultant membrane may be used to create more complex shapes, such as pouches, flat constructions with predefined conduits therein or as a liner for storage tanks.

Other articles made from material of the present invention may be useful for cooling warm objects, such as electronic devices, engines, motors, heated elements, and so forth.

BRIEF DESCRIPTION OF THE DRAWINGS

Embodiments of the present invention will now be described, by way of example, with reference to the accompanying drawings, in which:

FIG. 5a is a diagrammatic representation of an article in accordance with yet another embodiment of the present invention, said article being in the form of a pouch;

FIG. 5b is a half-sectional representation of the pouch of FIG. 5a;

FIG. 5c is an enlarged view of area 5c of FIG. 5b;

FIG. 13b is a cross-sectional view taken on line 13b—13b of FIG. 13a;

FIG. 14a is a cross-sectional view of a tubular article in accordance with another embodiment of the present invention, said article containing more than one type of film material;

FIG. 14b is an enlarged sectional view taken on line 14b—14bof FIG. 14a;

FIG. 15b is an enlarged sectional view taken on line 15b—15b of FIG. 15a;

DETAILED DESCRIPTION OF THE INVENTION

Figure 1:
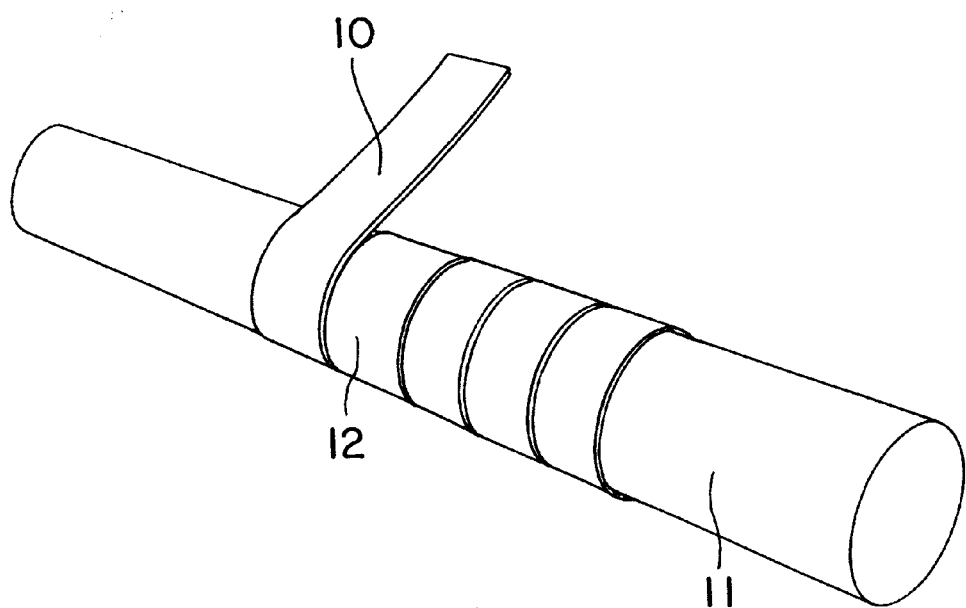
FIG. 1 is a diagrammatic perspective view illustrating a first method of producing an article in accordance with an embodiment of the present invention, said article being in the form of a tube.

Referring to the drawings, FIG. 1 illustrates a first method of producing a tubular article from the material of an embodiment of the invention. In this method, one or more layers of film 10, such as porous expanded polytetrafluoroethylene (ePTFE) film, is or are helically wrapped around a mandrel 11. The ends of the tube 1 2 thus formed are secured and the assembly is subjected to temperatures above the crystalline melt point of PTFE. The tube 12 should be sufficiently strong in the longitudinal direction to enable its removal from the mandrel 11 without suffering damage. Helical wrapping in two directions may impart different properties to the tube.

Figure 2:
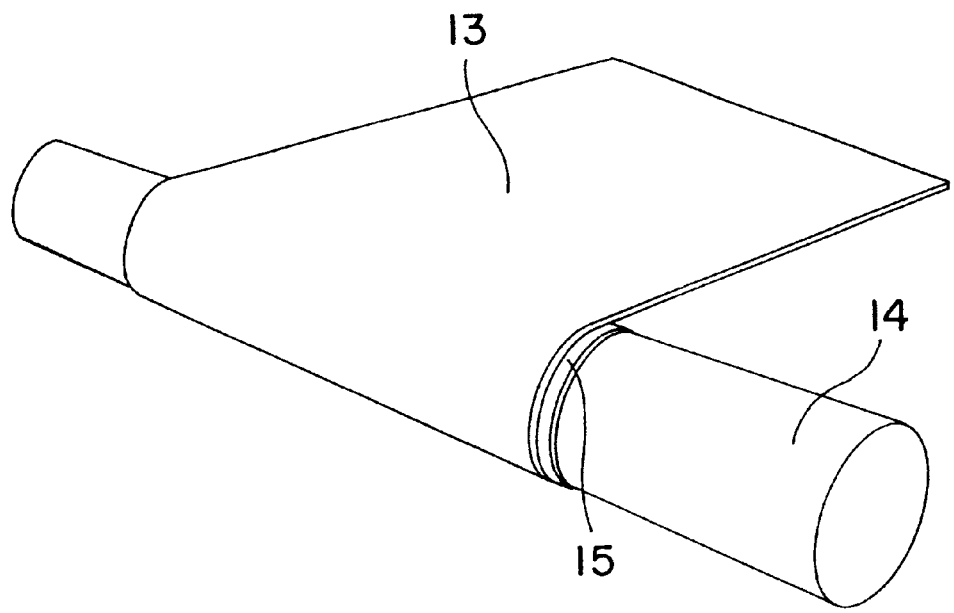
FIG. 2 is a diagrammatic perspective view illustrating a second method of producing an article in accordance with an embodiment of the present invention, said article being in the form of a tube.

FIG. 2 illustrates a second method of producing a tubular article from material of an embodiment of the invention. The method is the same as that for the tube 12 of FIG. 1 except that the wrapping is not carried out in a helical fashion but is effected by circumferential wrapping of a long length of porous film (such as ePTFE) film 13 about the longitudinal axis of a mandrel 14 to form a tube 15. Either the longitudinal or transverse direction of the film 13 may be wrapped onto the mandrel 14. Circumferential wrapping of long length film 13 such that the film is wrapped directly from the takeoff of a film spool on to the mandrel 14 limits the final tube length to the width of the precursor film 13.

Figure 3:
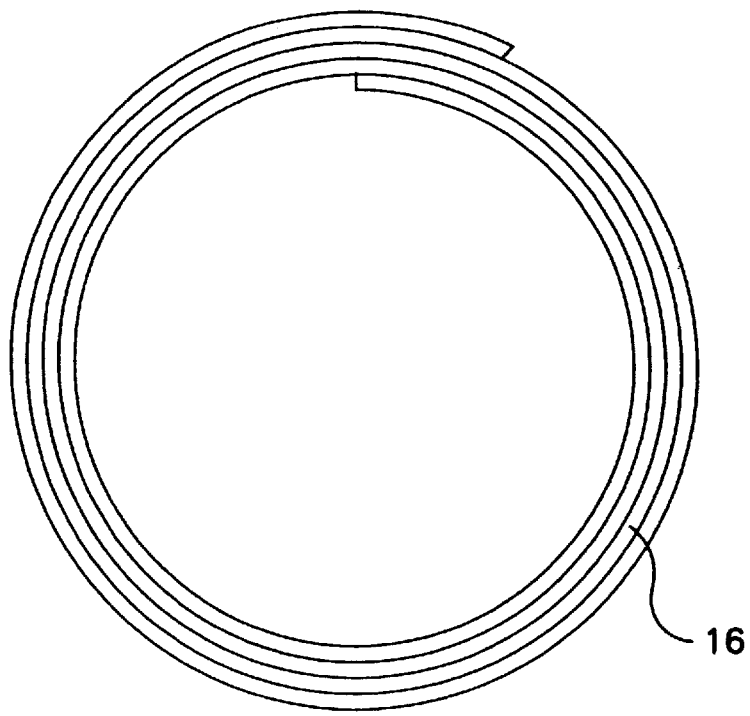
FIG. 3 is a cross-sectional view of a tubular article in accordance with one embodiment of the present invention.

The wrapping techniques described with reference to FIGS. 1 and 2 all produce a tube possessing a spiral cross-section 16 as shown in FIG. 3.

Figure 4:
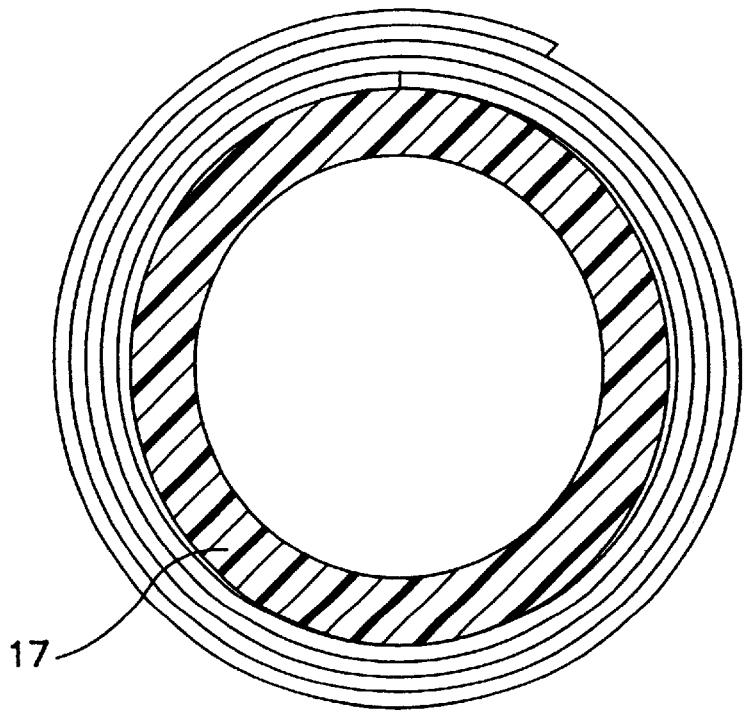
FIG. 4 is a cross-sectional view of a tubular article in accordance with another embodiment of the present invention.

If desired the tubes 12 and 15 of FIGS. 1 to 3 may be provided with a porous base tube 17 as shown in FIG. 4. In the finished tube of FIG. 4, the base tube 17 forms a luminal surface. In the FIG. 4 embodiment, the base tube 17 is applied to the mandrel before one or more layers of film, such as porous ePTFE is or are wrapped around the exterior surface of the base tube 17.

In any of the embodiments of FIGS. 1 to 4, the finished tube may be constituted by layers comprising a combination of both helical and circumferential wrapping.

Although the inventive article, such as a tube as described with reference to FIGS. 1 to 4, may be constituted by a single sheet of porous film it may be preferred that the articles of the invention, including the tubes of FIGS. 1 to 4, are constituted by multiple sheets of porous film.

When producing a multi-layered article, such as a tube as in FIGS. 1 to 4, the multi-layered film assembly is heated at sufficient temperature and a long enough time to ensure bonding of the layers. Insufficient heating may result in a tube prone to delamination. The number of film layers may be varied in order to optimise tube wall thickness and tube flexibility. The diameter of the mandrel may be varied to produce a tube of a desired inner diameter.

Although the embodiments of FIGS. 1 to 4 are in the form of tubes, it will be readily apparent to those of skill in the art that articles in accordance with embodiments of the present invention may take forms other than tubular. For example, a pouch 18 of porous ePTFE may be formed as shown in FIG. 5. Alternatively, the porous material may form other containers in a variety of shapes, conduits, container liners, membranes or the like which are intended to facilitate the containment during transport or storage of a low temperature, low surface energy fluid such as cryogenic liquid.

Figure 6:
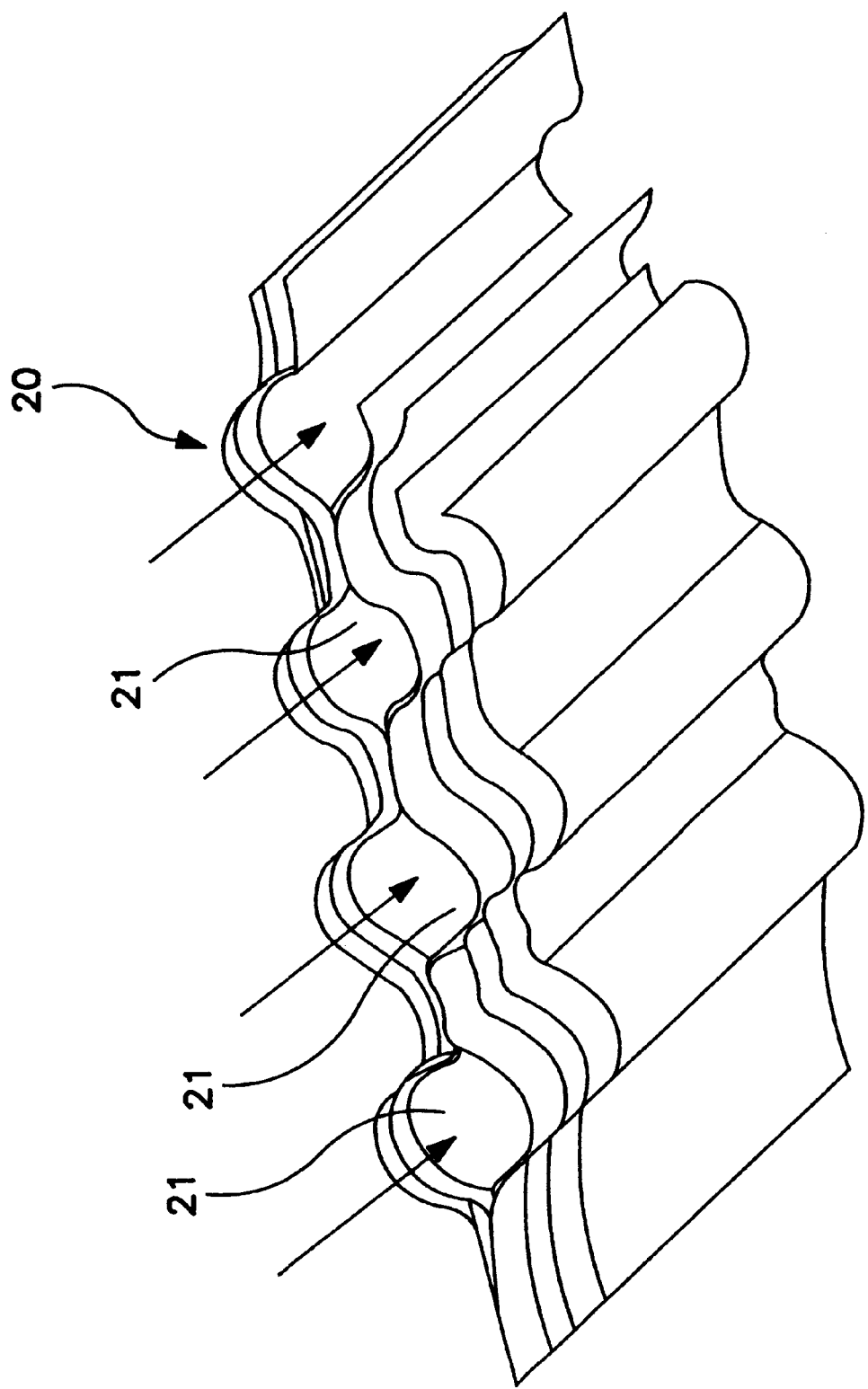
FIG. 6 is a diagrammatic representation of an article in accordance with yet another embodiment of the present invention, said article being in the form of a membrane having channels incorporated therein for transporting a cryogenic fluid.

In order to produce a membrane suitable for forming the pouch 18 as shown in FIG. 5, multiple layers of film are wrapped onto a large diameter mandrel, the ends restrained and the assembly placed in an oven in order to bond the layers together using the films and process temperatures described in the examples below. The large diameter tube thus produced is slit longitudinally to provide a flat membrane and the resultant membrane formed into a pouch 18, the multi-layered nature of the membrane 19 being evident from FIGS. 5b and 5c. Of course such a membrane may be formed into other shapes and forms, such as a flat construction 20 with predetermined conduits 21, as illustrated in FIG. 6.

Figure 7:
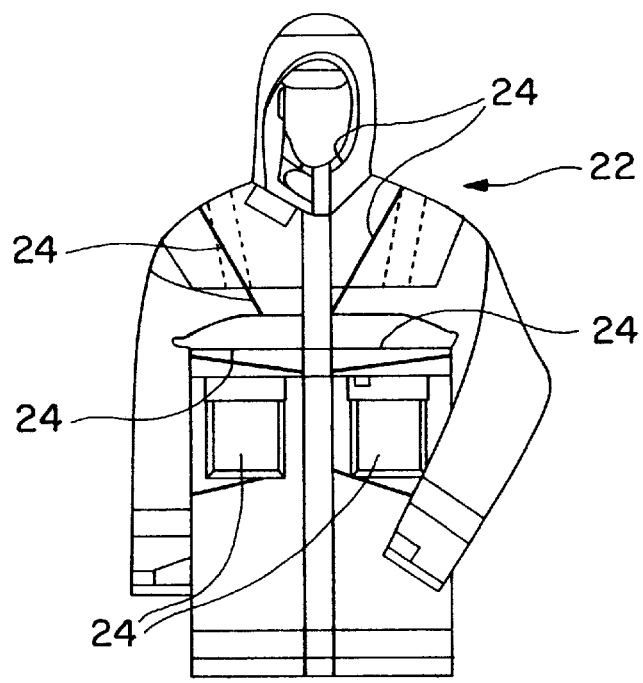
FIGS. 7 and 8 are diagrammatic representations of a garment intended to be worn in an environment where cooling of the wearer is desirable, said garment incorporating a tubular conduit in accordance with an embodiment of the present invention.
Figure 8:
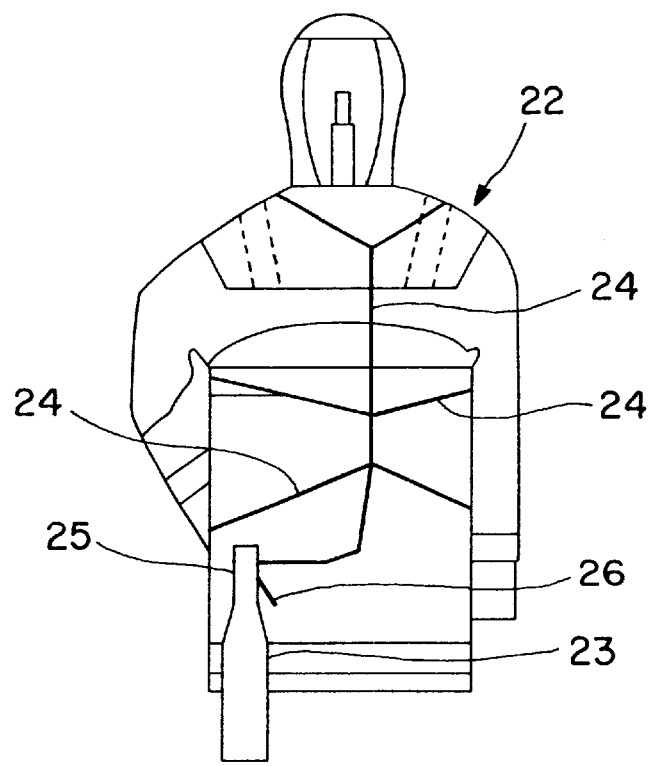

FIGS. 7 and 8 illustrate a particular embodiment of the present invention in which a conduit in the form of a tube of porous ePTFE capable of containing a cryogenic fluid such as liquid nitrogen, argon, or liquid air and which will allow the gaseous phase of the fluid to permeate to the exterior of the tube is incorporated in a protective garment such as may be worn by a firefighter or the like.

FIGS. 7 and 8 are respectively front and back views of a fire-fighting garment 22. The garment 22 incorporates a container 23 for containing liquid nitrogen or liquid air (in this example reference will be made to liquid nitrogen) connected to distribution tubes 24 forming a network of tubes for distributing the liquid nitrogen throughout the garment. The system of tubes 24 is located between an insulation layer of the garment and an inner lining.

The container 23 for holding liquid nitrogen comprises an insulated pressure vessel for holding the liquid nitrogen and a valve mechanism 25 controlled by a valve-trigger 26 for allowing passage of liquid nitrogen into the tubes 24. The tubes 24 are connected to the valve-trigger mechanism 26 via a restriction orifice, the restriction of which determines the cooling rate. The valve-trigger 26 allows the flow to be turned on and off or to be regulated. The liquid nitrogen container 23 contains a 0.5 kg charge which lasts for approximately 35 minutes at full gas delivery. Over this time period, 0.5 kg of liquid nitrogen provides approximately 100 watts of cooling. The container 23 is of a suitable shape to be located in a pocket inside or more preferably outside the garment where it may be manually controlled by the wearer.

When the liquid nitrogen is fed into the network of tubes 24, the nitrogen permeates through the wall of the tubes to emerge from the outer surface of the tubes in gaseous phase. The evaporative transition of the nitrogen from the liquid to gaseous phase provides a cooling effect at the outer tube surface which is transmitted to the wearer of the garment.

In an alternative embodiment, it is possible for the flow to be regulated by an electronic control means responsive to temperatures within the garment, so that the garment temperature is maintained thermostatically to a constant value.

Liquid Nitrogen Leak Pressure Test

Figure 9:
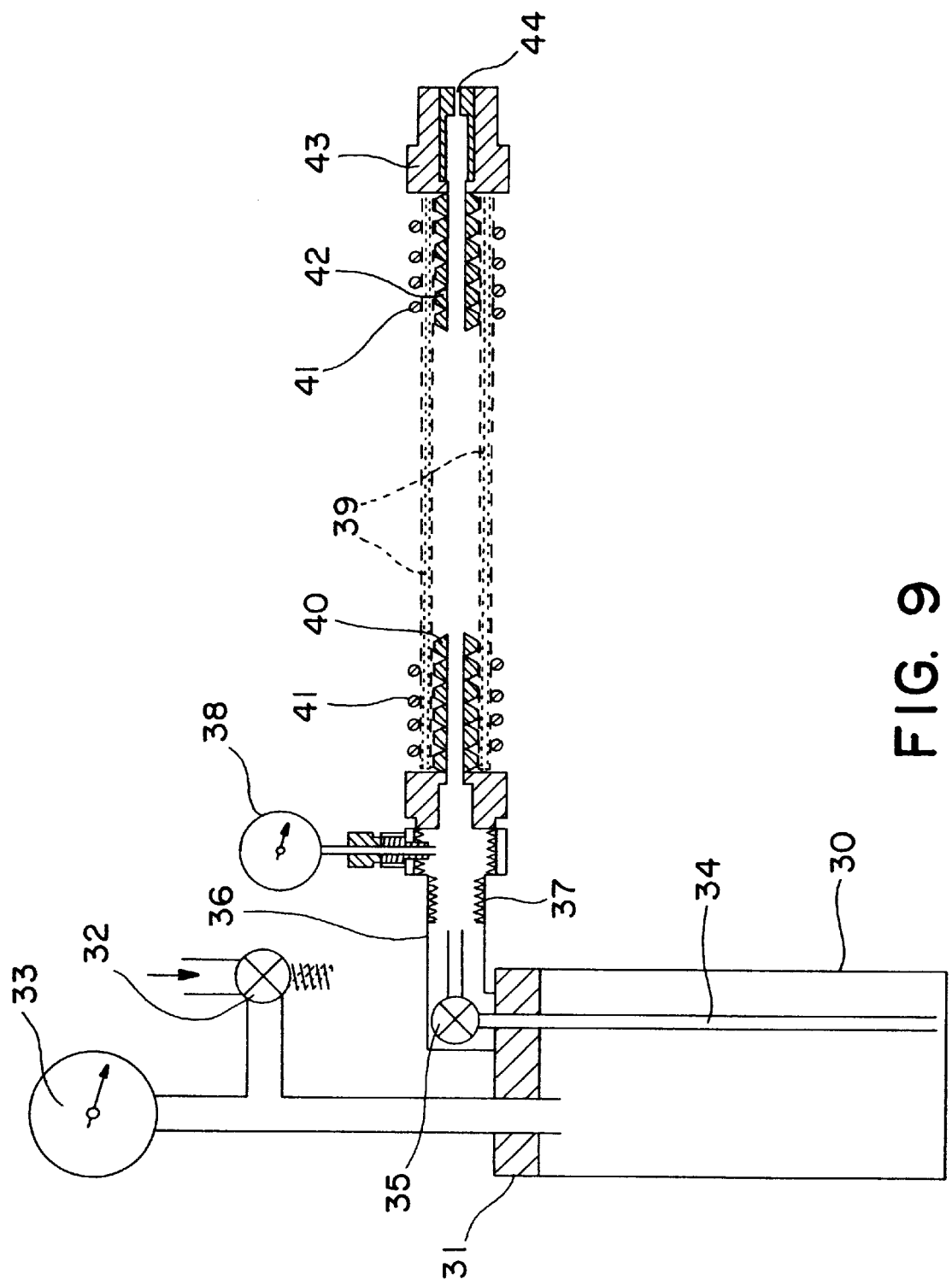
FIG. 9 is a diagrammatic illustration of one form of test apparatus for testing the efficiency of tubular articles in accordance with embodiments of the present invention.

A liquid nitrogen leak pressure test was developed to measure the pressure at which liquid nitrogen permeates through a cryogen tube wall. Liquid nitrogen is added to the lumen of tested tubes and pressurised. The tube is examined to ensure the permeation of gaseous nitrogen through the tube wall. The pressure at which liquid nitrogen leaks through the walls of the tube is noted and recorded. This pressure corresponds to the pressure at which the mass flow rate of liquid nitrogen flowing through the wall in the radial direction exceeds the mass evaporation rate of the liquid at the outer wall surface. A schematic representation of the test apparatus appears in FIG. 9. A 0.5 Liter Dewar flask (Cryo Jem. Cryomedical Instruments Ltd. Nottinghamshire UK) 30 is obtained (a larger flask may be used if desired.) The Dewar flask lid 31 is dried to avoid the outlet valve 35 becoming blocked due to moisture ingress leading to accumulation of ice particles. The Dewar flask 30 is filled with liquid nitrogen and the lid 31 slowly screwed onto the canister allowing excess liquid nitrogen to boil off.

Air pressure is applied to the top of the liquid nitrogen reservoir. The pressure is regulated via a precision regulator (Moore. Model 41-100) 32. A pressure monitoring tap is included in the line entering the flask for safety reasons. The Dewar flask 30 inlet pressure is measured with a multi-port pressure transducer (Heise, model PM. Newtown. Conn.) or gauge 33. Liquid nitrogen is forced out of the flask through a 0.062 inch (1.58 mm) inner diameter stainless steel dip tube 34 that extends from near the bottom of the flask to an opening in the flask lid 31. A lever valve 35 at the head controls the exit flow. The dip tube 34 extends beyond this valve 35, enclosed in a larger plastic conduit 36. Threaded fittings 37 are attached to the larger conduit 36. Another pressure monitoring tap is included in the line in order to measure the inlet pressure to the tested tube (using the same pressure monitor as described above or guage 38). A standard barb fitting 40 is screwed into the fitting 37.

The tube 39 to be tested is cut to a length of 180 mm. The test length is about 135 mm since portions of the ends are attached over fittings 40, 42. One end of the tube 39 is attached over the barb fitting 40 and secured by wrapping silver plated copper wire 41 tightly around the outside of the tube 39. The other end of the tube 39 is fitted with a barb fitting 42 and secured in the same manner. The outlet of this barb 42 fitting is fitted with a 0.50 inch (12.7 mm) long PTFE cylindrical plug 43. The plug 43 has a 0.062 inch (1.58 mm) diameter, 0.075 inch (1.90 mm) long hole 44 drilled through its centre, which is counter-bored to 0.125 inch (3.18 mm) diameter for a length of 0.425 inch (10.8 mm). The outlet orifice diameter and dip tube inside diameter are specified to match. These are the smallest flow restrictions in the line exiting the flask. This choice of outlet orifice 44 and dip tube inside diameter enables a sufficient test duration before exhausting the liquid nitrogen from the flask. Venting the outlet to atmosphere enhances the flow of liquid nitrogen into the tube to be tested.

The tube 39 is positioned horizontally. The test is performed under a hood at ambient conditions: room temperature is 19.6° C., relative humidity is about 46% and in essentially still air. The nitrogen exiting the end of the tube is directed outside of the hood in order not to disturb the air flow under the hood.

The tube 39 is tested in the following manner. The Dewar flask lever valve 35 is opened. The pressure regulator 32 is adjusted until liquid nitrogen exits the orifice 44 at the end of the test sample tube. The discharge of liquid nitrogen is readily confirmed by placing an expanded PTFE membrane in the path of the exiting nitrogen and noting wetting of the membrane. All fittings and connection are examined to ensure that no leaks are present. The tube 39 is then examined for gaseous permeation of nitrogen through its wall, along the length of the tube as evidenced by a plume of condensed water vapour in the vicinity of the tube. The applied pressure is adjusted until such a steady plume is observed. A steady plume indicates both gas permeation and that the air is still in the test environment. The plume as described demonstrates that gaseous nitrogen is exiting along the length of the tube 39, which is indicative of distributed evaporative cooling. Note that the pressure increase in the Dewar flask 30 resulting from the evaporation of the nitrogen alone may be sufficient to pressurise the tube 39.

The tube under test is allowed to chill for a period of 30 seconds prior to further pressure adjustment. The pressure is increased until the first droplet of liquid nitrogen appears on the outer surface of the tested tube 39. The pressure regulator 32 is slowly and slightly opened and closed to ensure that this is the pressure corresponding to the formation of the first stable droplet. A stable droplet is one that under constant pressure, remains about the same size during testing for at least 5 seconds, without dripping. By decreasing the pressure the droplet will evaporate. With increasing pressure, the droplet size increases past stability until liquid is first dripping rapidly and then running out of the tube wall. The pressure measured at the entrance to the tested tube 39 is recorded. This average of three pressure readings, taken at intervals of at least 20 seconds as measured with the pressure gauge 38 is recorded as the liquid nitrogen leak pressure in Table 2. Venting the tube 39 to atmosphere via the use of the plug 43 with the 0.062 inch (1.58 mm) orifice 44 is important to achieve the distribution of liquid nitrogen across the length of the tube 39. Tubes in accordance with the preferred embodiments of the present invention permeate the most gas when liquid cryogen is present on the interior surface. Boiling of the liquid inside the tube appears to enhance gaseous permeation.

Whereas this test was developed specifically for testing tubes, the same principles may be applied to create a test for the examination of the properties of other shapes of materials. The important elements of the test include: controlled application of pressure and ability to measure the pressure required to force a mass of liquid nitrogen sufficient to form a stable drop of liquid on the outside wall of the test article, through the thickness of the article while the internal surface of the article is in contact with liquid.

Figure 17:
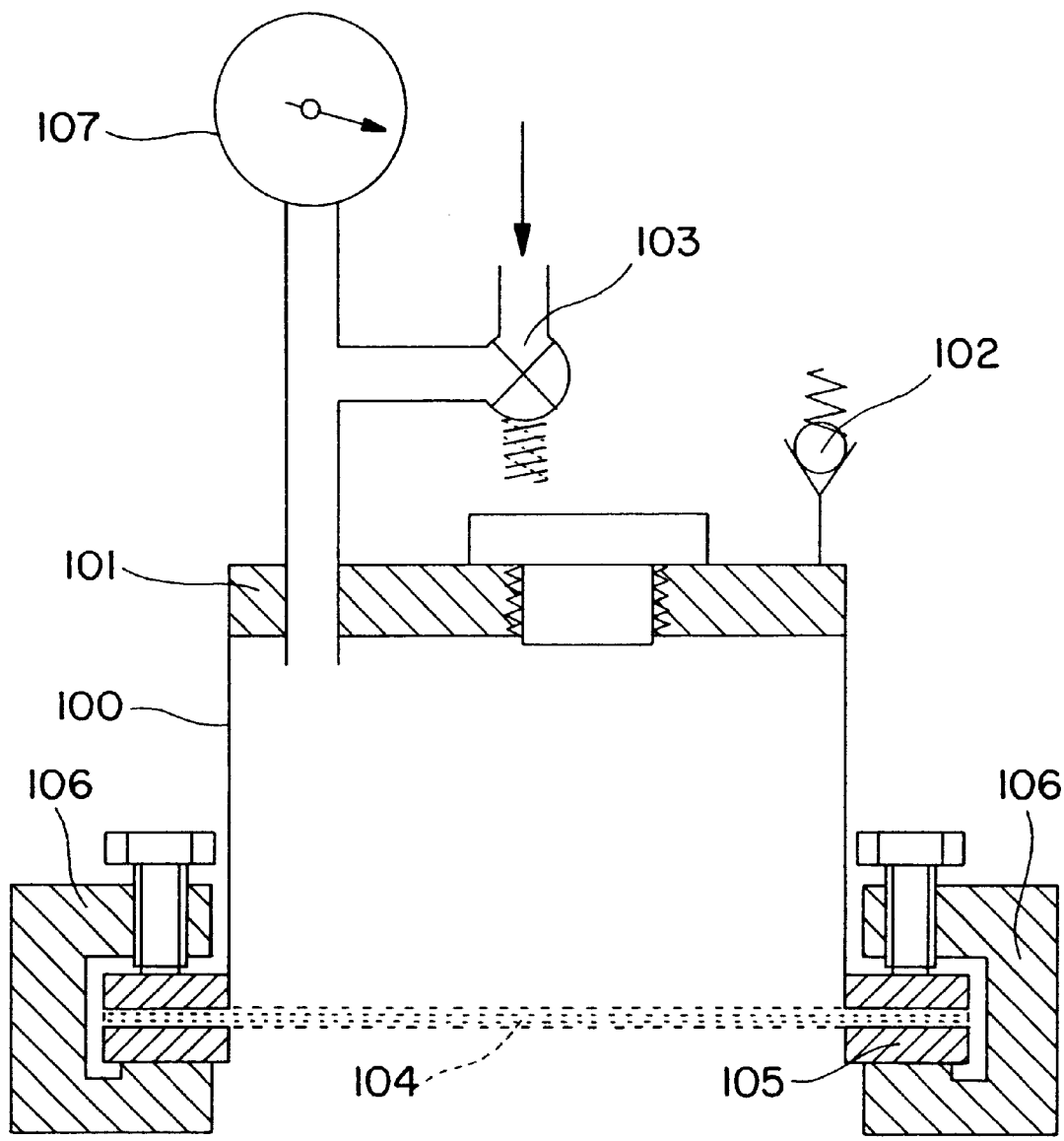
FIG. 17 is a diagrammatic illustration of another form of test apparatus for testing the efficiency of (membrane) articles in accordance with embodiments of the present invention.

A liquid nitrogen leak pressure test can also be performed on a flat sheet article of the present invention. A schematic representation of the test apparatus appears in FIG. 17. A cylinder 100 is equipped with a fill lid 101 and pressure relief valve 102, a pressurization means 103, and a pressure measurement guage 107. The flat sheet article 104 is attached to the bottom of the cylinder by a ring 105 and clamps 106. The cylinder is filled with liquid nitrogen to cover the sheet sample and the lid 101 is screwed on slowly to allow excess nitrogen to boil off. Air pressure is applied to the top of the cylinder and is regulated and monitored as previously described for the liquid nitrogen leak pressure testing of tubes. The test is also conducted as previously described. During these tests the article under test must be exposed to the same environmental temperature and humidity conditions as stated previously, allowing stable convection and evaporation conditions at the outer surface of the test article.

Cryogenic Cooling Garment Test

Figure 10A:
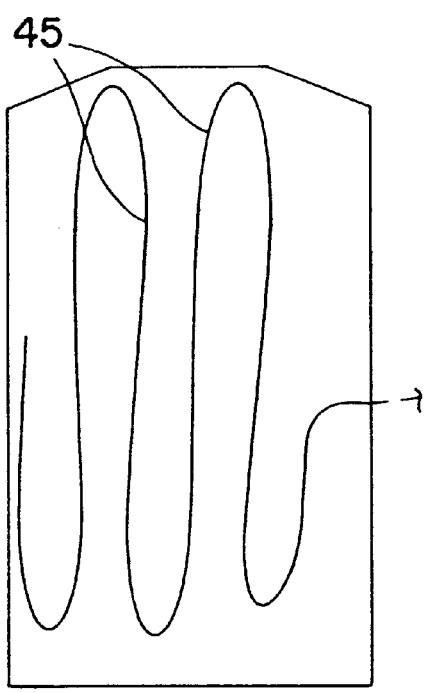
FIGS. 10a and 10b are diagrammatic representations of a garment used in the Cryogenic Cooling Garment Test described hereinafter.
Figure 10B:
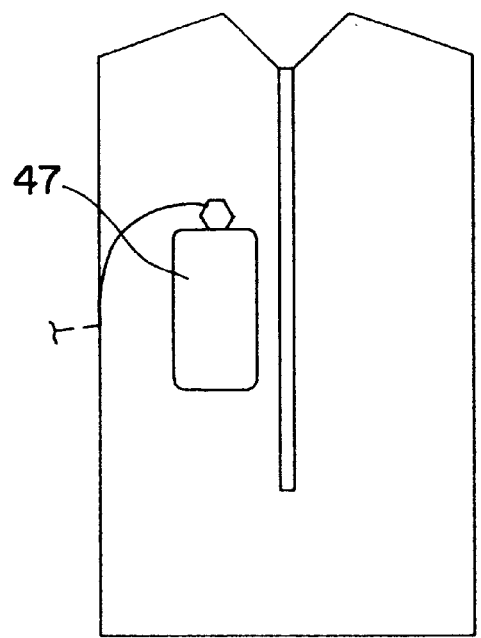

A tube 45 is placed inside a vest and connected at one end to a Dewar flask 47 containing liquid nitrogen as indicated in FIGS. 10a and 10b. The other end of the tube 45 is vented to atmosphere. A subject wears the vest over a shirt and wears a fire jacket over the vest. The subject walks on a treadmill set at a rate of 3 miles (4.8 km)/hour at a 5% incline. The test is conducted in a room at ambient conditions: room temperature is 21° C., relative humidity is about 41% and essentially still air. The cooling system is worn over underwear and under a heavy, insulated jacket, minimum weight 1.5 kg, during test.

Isopropanol Bubble Point, Gurley Air Permeability and Tube Dimension Measurement Testing for the Tubes The tubes are mounted to barbed luer fittings and secured with clamps and tested intact. The values of three samples per tube are obtained and averaged for the isopropanol (IPA) bubble point and the thickness measurements. One Gurley air permeability measurement is made per tube.

The isopropanol bubble points (IBP) are tested by first soaking the tubing fixtures in IPA for approximately six hours under vacuum, then removing the tubing from the IPA and connecting the tubing to an air pressure source. Air pressure is then manually increased at a slow rate until the first steady stream of bubbles is detected. The corresponding pressure is recorded as the IBP.

The air permeability measurement is determined using a Gurley Densometer (Model 4110, W. & L. E. Gurley, Troy, N.Y.) fitted with an adapter plate that allows the testing of a length of tubing. A one foot length of tubing is tested, unless otherwise noted. The average internal surface area is calculated from the measurements utilising a Ram Optical Instrument (OMIS II 6×12, Ram Optical Instrumentation Inc., 15192 Triton Lane, Huntington Beach, Calif.). The Gurley Densometer measures the time it takes for 100 cc of air to pass through the wall of the tube under 4.88 inches (12.40 cm) of water head of pressure. The air permeability value is calculated as the inverse of the product of the Gurley number and the internal surface area of the tube expressed in units of cc/min cm$^2$.

The wall thickness and inner diameter of the tube are measured using the same OMIS II optical system.

Bubble Point and Thickness Testing for Films

Bubble point of films is measured according to the procedures of ASTM F31 6-86. The film is wetted with isopropanol or methanol, as noted in the examples.

Film thickness is measured with a snap gauge (Mitutoyo, model 2804-10, Japan).

Flexibility Test

The tube is placed in a 1.5 L Dewar flask filled with liquid nitrogen for a period of 30 seconds. The tube is removed and quickly wrapped around a hollow steel cylinder having an outer diameter of 1.5 inch (38.1 mm) and a wall thickness of 0.05 inch (1.27 mm). The tube is visually examined for evidence of fracture, to determine if the wrapping had compromised the ability of the tube to hold liquid (liquid argon is used in testing the tubes of Example 8). A tube that does not fracture during this test is considered to be flexible.

EXAMPLE 1

Expanded PTFE film is obtained in a 42 inch (106.7 mm) width possessing a thickness of 0.0035 inch (0.09 mm), a Gurley number of 39.5 seconds and an isopropanol bubble point of 48.5 psi (0.334 MPa). All measurements are made in accordance with the procedures previously described, unless otherwise indicated. The film is circumferentially wrapped around a 0.25 inch (6.4 mm) stainless steel mandrel such that the width of the film becomes the length of the resultant tube as depicted in FIG. 2. Twelve layers of film are wrapped around the mandrel. The cross-sectional geometry of the layered construction is spiral-shaped as indicated in FIGS. 3 and 4. The construction parameters for this and other examples appear in Table 1.

The ends of the layered film construction are restrained by suitable means to prevent shrinkage in the longitudinal direction of the construction (the longitudinal axis of the mandrel) during subsequent heat treatment.

TABLE 1

| Example | Tube Length | Wrap type | Number of Layers | Base tube | Mandrel ID | Salt Bath |
|---|---|---|---|---|---|---|
| 1 | 106.7 cm | circum. | 12 | no | 6.4 mm | 365 deg C./1.5 min |
| 2 | 106.7 cm | circum. | 12 | yes | 6.4 mm | 365 deg C./2 min |
| 3 | 106.7 cm | circum. | 12 | yes | 6.4 mm | 365 deg C./2 min |
| 4 | 109.2 cm | helix | 18 | yes | 6.4 mm | 366 deg C./2 min |
| 5 | 86.4 cm | longitudinal | 12 | no | 6.4 mm | 366 deg C./1.5 min |
| 6 | at least 109.8 cm | circum./helix | 8 circum./48 helical | yes | 4.0 mm | not applicable |
| 8a | 96.5 cm | circum. | 18 | no | 6.4 mm | 362 deg C./2.5 min |
| 8b | 95.2 cm | circum. | 24 | no | 6.4 mm | 362 deg C./2.5 min |

ID = inner diameter

The restrained construction is submerged in a 365° C. molten salt bath oven for 1.5 minutes in order to bond the ePTFE layers and impart dimensional stability to the tube. The tube is allowed to cool then washed in ambient temperature water to remove residual salt. The clamps are removed and the tube is removed over the end of the mandrel.

The tube is measured for inner diameter, wall thickness, Gurley number, and IBP in accordance with the techniques previously described. The tube is also tested to determine if it serves as an effective conduit for the transport of liquid nitrogen while allowing the passage of gaseous nitrogen through the wall. Further tests are performed to determine the pressure at which the tube passes liquid nitrogen through the wall. The test results for this and other examples appear in Table 2. The tube controls the passage of gaseous nitrogen and inhibits the passage of liquid nitrogen at an average LNLP of 6.0 psi (0.041 MPa). The individual pressure readings are 5.8 psi (0.040 MPa), 5.8 psi (0.040 MPa) and 6.4 psi (0.044 MPa).

A portion of the tube is dipped in liquid nitrogen for 30 seconds then quickly wrapped around the outside of a 1.5 inch (38.1 mm) outer diameter, 0.05 inch (1.27 mm) wall thickness steel hollow cylinder to demonstrate the flexibility of the cold tube. The tube does not fracture under these conditions.

Figure 11:
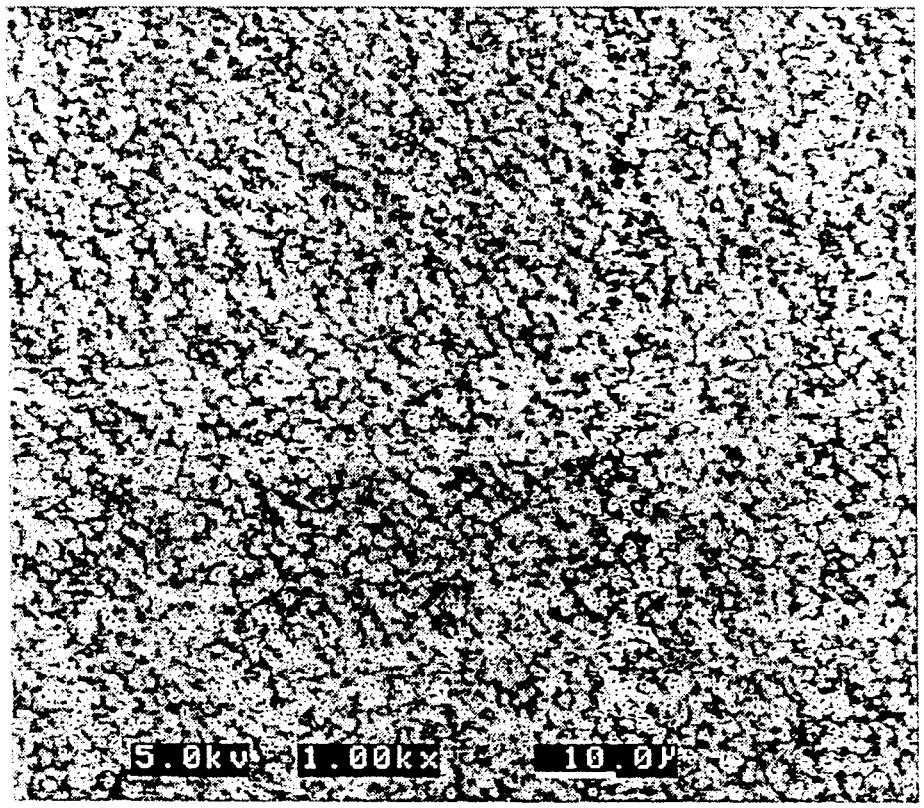
FIG. 11 is a scanning electron micrograph (SEM) referred to in Example 1 as described hereinafter.

A scanning electron micrograph of the tube cross-section (a view taken transverse from the longitudinal axis of the tube) appears in FIG. 11. A 10 micrometer reference bar appears at the bottom right of the figure.

This tube is tested as a cooling garment tube as described above. A 36 inch length of this tube is used to create a cryogenic cooling garment as illustrated in FIG. 10. The subject walks on the treadmill while wearing the garment. The tube and garment perform satisfactorily. The tube does not leak liquid nitrogen and permeates enough gaseous nitrogen to keep the subject cool throughout the test.

Figure 12:
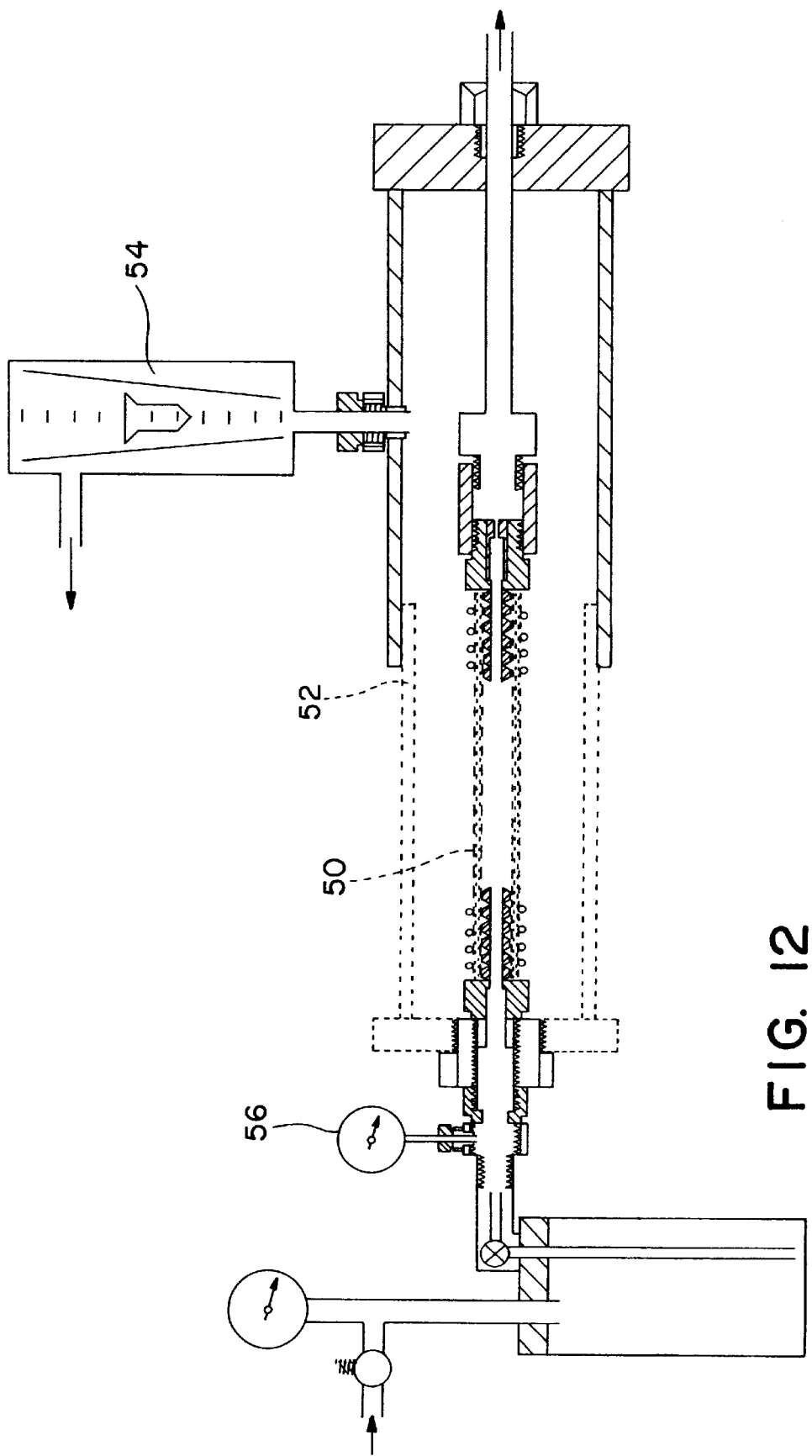
FIG. 12 is a diagrammatic illustration of test apparatus that is a modified version of the apparatus illustrated in FIG. 9 for testing the efficiency of articles in accordance with embodiments of the present invention.

This tube is also tested to measure the flow rate of gaseous nitrogen permeating through the wall. The test set up described for measuring the liquid nitrogen leak pressure is slightly modified from that of FIG. 9, and is illustrated in FIG. 12. The change consists of enclosing the tube 50 inside a cylindrical enclosure 52 of about 1.5 inch (38.1 mm) inner diameter such that the tube 50 still vents to atmosphere. All of the gas permeating through the wall of the tube 50, however, is contained within the enclosure 52. An air flow meter (range 2-20 standard cubic feet per hour (scfh) [0.06-0.6 standard cubic meters per hour (scmh)], King Instrument Co.) 54 is connected to a port in the wall of the enclosure 52. The flow rate of the permeating gas is measured. At a pressure of 2.5 psi (0.017 MPa) as indicated by pressure transducer or guage, the flow rate of gas through the wall of this tube 50 is measured within 2.5 minutes. Liquid nitrogen does not leak through the tube wall at this pressure. Flow rates of 3.5 scfh (0.10 scmh), 3.7 scfh (0.11 scmh) and 4.0 scfh (0.12 scmh) result. Note that the measurements are not corrected for temperature or for the use of nitrogen gas.

EXAMPLE 2

An additional tube is made in accordance with the same steps and materials as described in Example I and Table I except for the differences noted as follows.

A thin longitudinally expanded PTFE tube is obtained possessing a wall thickness of 0.119 mm, an inner diameter of 3.0 mm, and an IBP of 1.0 psi (0.007 MPa). This tube is snugly slipped over the 0.25 inch (6.4 mm) diameter mandrel. The ePTFE film of Example 1 is then applied over the thin ePTFE base tube in the same manner as the film is applied to the mandrel in Example 1. The construction is restrained then heated in a 365° C. molten salt bath for 2 minutes, cooled, washed in ambient water, then removed from the mandrel. In all examples, the presence of a base tube results in easier removal of the tube from the mandrel.

The tube is tested as described in Example 1 and the results appear in Table 2. The tube controls the passage of gaseous nitrogen and inhibits the passage of liquid nitrogen at an average LNLP of 0.4 psi (0.003 MPa). The three individual pressure readings are all 0.4 psi. Another portion of the same tube is tested. All three liquid nitrogen leak pressures are 0.7 psi (0.005 MPa). A portion of the tube is dipped in liquid nitrogen for 30 seconds then quickly wrapped around the outside of a 1.5 inch (38.1 mm) outer diameter, 0.05 inch (1.27 mm) wall thickness steel hollow cylinder to demonstrate the flexibility of the cold tube. The tube does not fracture under these conditions.

EXAMPLE 3

Another tube is created in this same manner as Example 2 except that ⅛ inch (3.18 mm) PTFE dry paste-extruded beading is applied in a helical fashion to the base tube prior to the application of the film. The beading is applied with a ¾ inch (19.05 mm) lead. The purpose of the beading is to impart greater compression resistance and kink resistance to the final tube upon bending.

Figure 13A:
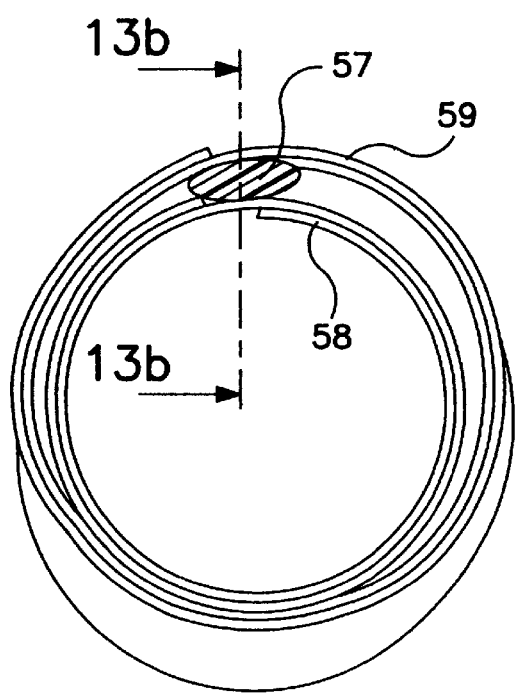
FIG. 13a is a cross-sectional view of an article in accordance with another embodiment of the present invention, said article being in the form of a tube with a helically-applied reinforcement.
Figure 13B:
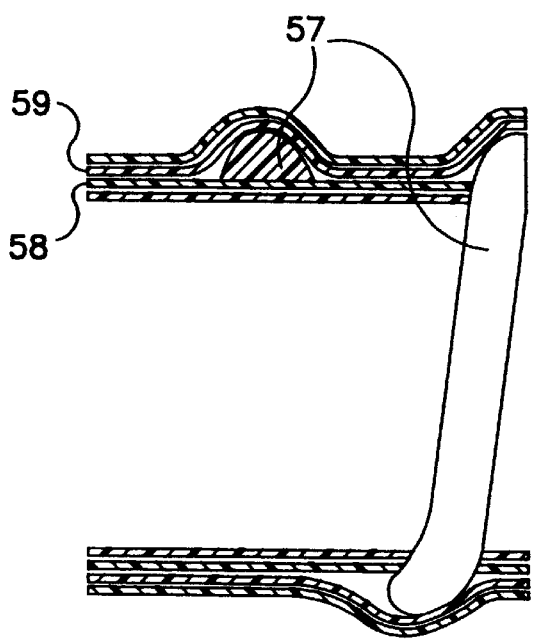

An example of a tube including such beading is illustrated in FIGS. 13*a* and 13*b*, although in the illustrated tube the beading 57 is provided between two wrapped films 58 and 59, rather than between a base tube and a wrapped film.

The tube is tested as described in Example 1 and the results appear in Table 2. The tube controls the passage of gaseous nitrogen and inhibits the passage of liquid nitrogen at an average LNLP of 6.6 psi (0.046 MPa). The individual pressure readings are all 6.6 psi (0.046 MPa). A portion of the tube is dipped in liquid nitrogen for 30 seconds then quickly wrapped around the outside of a 1.5 inch (38.1 mm) outer diameter, 0.05 inch (1.27 mm) wall thickness steel hollow cylinder to demonstrate the flexibility of the cold tube. The tube does not fracture under these conditions.

TABLE 2

| Example | Tube ID | Tube Thickness | Tube Gurley** | Tube IBP | LNLP | Air Permeability |
|---------|---------|----------------|---------------|----------|------|------------------|
| 1 | 5.78 mm | 0.56 mm | 77.4 | 0.385 MPa | 0.041 MPa | 1.39 cc/min cm$^2$ |
| 2 | 6.04 mm | 0.56 mm | 82.1 | 0.387 MPa | 0.003 MPa/0.005 MPa | 1.26 cc/min cm$^2$ |
| 3 | 6.24 mm | 1.14 mm | 75.1 | 0.259 MPa | 0.046 MPa | 1.34 cc/min cm$^2$ |
| 4 | 6.36 mm | 0.67 mm | 185.4 | 0.420 MPa | 0.075 MPa | 0.54 cc/min cm$^2$ |
| 5 | 5.79 mm | 0.61 mm | 82.0 | 0.365 MPa | 0.057 MPa | 1.32 cc/min cm$^2$ |
| 6 | 3.91 mm | 0.33 mm | 49.3 | 0.185 MPa | 0.003 MPa | 6.50 cc/min cm$^2$ |
| 8a | 6.33 mm | 64.7 mm | 714.8 | 0.446 MPa | *0.035 Mpa | 0.35 cc/min cm$^2$ |
| 8b | 6.25 mm | 66.8 mm | 477.2 | 0.460 MPa | *0.049 Mpa | 0.44 cc/min cm$^2$ |

*these values represent the liquid argon leak pressure
**in units of: seconds per 100 cc of air at 4.88 inches (12.40 cm) of water
ID = inner diameter

EXAMPLE 4

A tube is made using the film of Example 1. The film is slit to provide a width of 0.875-inch (22.2 mm) and is helically applied over the base tube of Example 2. The film is applied with approximately 50% overlap to provide about 18 layers of film over the base tube. The restrained construction is placed in a 366° C. molten salt bath for 2 minutes. The tube enables the passage of gaseous nitrogen and inhibits the passage of liquid nitrogen at an average LNLP of 10.9 psi (0.075 MPa). The individual pressure readings are 9.0 psi (0.062 MPa), 9.0 psi (0.062 MPa) and 14.8 psi (0.102 MPa). A portion of the tube is dipped in liquid nitrogen for 30 seconds then quickly wrapped around the outside of a 1.5 inch (38.1 mm) outer diameter, 0.05 inch (1.27 mm) wall thickness steel hollow cylinder to demonstrate the flexibility of the cold tube. The tube does not fracture under these conditions.

EXAMPLE 5

A tube is made in accordance with the same steps and materials as described in Example I and Table 1 except for the differences noted as follows.

The film of Example 1 is circumferentially wrapped around a 0.25 inch (6.4 mm) stainless steel mandrel such that the length of the film becomes the length of the resultant tube. As in Example 1, twelve layers of film are wrapped around the mandrel. This method of construction enables the creation of a length of tube that is not limited to the width of the film. The restrained construction is submerged in a 366° C. molten salt bath oven for 1.5 minutes in order to bond the ePTFE layers and impart dimensional stability to the tube.

The tube controls the passage of gaseous nitrogen and inhibits the passage of liquid nitrogen at an average LNLP of 8.2 psi (0.057 MPa). The individual pressure readings are 8.2 psi (0.057 MPa), 8.2 psi (0.057 MPa) and 8.3 psi (0.057 MPa).

A portion of the tube is dipped in liquid nitrogen for 30 seconds then quickly wrapped around the outside of a 1.5 inch (38.1 mm) outer diameter, 0.05 inch (1.27 mm) wall thickness steel hollow cylinder to demonstrate the flexibility of the cold tube. The tube does not fracture under these conditions.

EXAMPLE 6

A tube is made from three components, combining the construction methods of Examples 1 and 4. That is, a base tube is placed over a 4.0 mm outer diameter mandrel, followed by circumferentially wrapping a film over the base tube, and finally wrapping yet another film helically atop the circumferential layers. The base tube is a longitudinally expanded PTFE tube possessing a wall thickness of about 0.410 mm, an inner diameter of 3.9 mm, and an IBP of 1.1 psi (0.008 MPa). The circumferentially wrapped film is an expanded PTFE film approximately 0.0017 inch (0.04 mm) thick, having an IBP of about 29.1 psi (0.201 MPa) and a Gurley number of about 17.7 sec. Eight layers of this film are applied such that the transverse direction (width) of the film is oriented in the longitudinal direction of the mandrel.

Another type of film is next applied to the construction. This film is a fluorinated ethylene propylene-coated porous ePTFE film. This film is made by a process that comprises the steps of:

a) contacting an ePTFE film with a layer of fluorinated ethylene propylene (FEP);

b) heating the composition obtained in step a) to a temperature above the melting point of the FEP;

c) stretching the heated composition of step b) while maintaining the temperature above the melting point of FEP; and d) cooling the product of step c). In this case, the FEP adhesive coating on the porous expanded PTFE film is discontinuous (porous) due to the amount and rate of stretching, the temperature during stretching, and the thickness of the FEP adhesive prior to stretching.

This film has an MBP of 1.7 psi (0.012 MPa) and a thickness of 0.0004 inch (0.01 mm). The MBP is measured in the same manner as is IBP for film, except that methanol is substituted for isopropanol. This film is slit to a 0.5 inch (12.7 mm) width and then applied helically in multiple traverse passes up and down the length of the mandrel at angles 15° off perpendicular in order to apply 48 layers.

The restrained construction is placed in a convection oven set at 380° C. for 4.9 minutes in order to bond the ePTFE layers and impart dimensional stability to the tube. The tube controls the passage of gaseous nitrogen and inhibits the passage of liquid nitrogen at an average LNLP of 0.4 psi (0.003 MPa). The individual pressure readings are 0.3 psi (0.002 MPa), 0.3 psi (0.002 MPa) and 0.4 psi (0.003 MPa). The length of sample used for the isopropanol bubble point and Gurley air permeability testing is 6.0 inch (15.2 cm).

A portion of the tube is dipped in liquid nitrogen for 30 seconds then quickly wrapped around the outside of a 1.5 inch (38.1 mm) outer diameter, 0.05 inch (1.27 mm) wall thickness steel hollow cylinder to demonstrate the flexibility of the cold tube. The tube does not fracture under these conditions.

This tube is tested as a cooling garment tube as described above. A 43.25 inch (109.8 cm) length of this tube is used to create a cryogenic cooling garment. The subject walks on the treadmill while wearing the garment. The tube and garment perform satisfactorily. The tube does not leak liquid nitrogen and permeates enough gaseous nitrogen to keep the subject cool throughout the test.

EXAMPLE 7

A commercially available rigid ceramic tube was obtained (FERRO Ceramic WFAO-NAJADE (800), Rochester, N.Y.) and tested. The tube dimensions are measured using a digital calliper. The inner and outer diameters are 14.8 mm and 22.1 mm, respectively. The tube is tested for LNLP as described above. The test cannot be performed as required because the tube leaks prior to increasing the pressure enough to enable liquid nitrogen to exit the downstream orifice. Therefore, a value for LNLP cannot be obtained. A plume of gaseous nitrogen along the length of the tube, absent liquid nitrogen leakage through the exterior surface, does result at low pressures, namely at 0.2 psi (0.001 MPa).

EXAMPLE 8

Two tubes are made in accordance with the process described in Example 1, except as noted in Table 1. The tubes are made with a different number of layers and placed in a molten salt bath set at a different temperature, for a different period of time as compared to the tube of Example 1. The tubes are tested for leak pressure in the manner described above except that argon is used as the cryogenic liquid instead of nitrogen. The results appear in Table 2.

(a) the 18 layer tube controls the passage of gaseous argon and inhibits the passage of liquid argon at an average leak pressure of 5.1 psi (0.035 MPa). The individual pressure readings are 5.4 psi (0.037 MPa), 5.1 psi (0.035 MPa) and 4.9 psi (0.034 MPa). A portion of the tube is dipped in liquid nitrogen for 30 seconds then quickly wrapped around the outside of a 1.5 inch (38.1 mm) outer diameter, 0.05 inch (1.27 mm) wall thickness steel hollow cylinder to demonstrate the flexibility of the cold tube. The tube does not fracture under these conditions.

(b) the 24 layer tube controls the passage of gaseous argon and inhibits the passage of liquid argon at an average leak pressure of 7.1 psi (0.049 MPa). The individual pressure readings are all 7.1 psi (0.049 MPa). A portion of the tube is dipped in liquid nitrogen for 30 seconds then quickly wrapped around the outside of a 1.5 inch (38.1 mm) outer diameter, 0.05 inch (1.27 mm) wall thickness steel hollow cylinder to demonstrate the flexibility of the cold tube. The tube does not fracture under these conditions.

The length of samples used for the isopropanol bubble point and Gurley air permeability testing is 4.8 inch (12.2 cm) and 5.7 inch (14.5 cm) for Examples 8a and 8b, respectively.

Figure 15A:
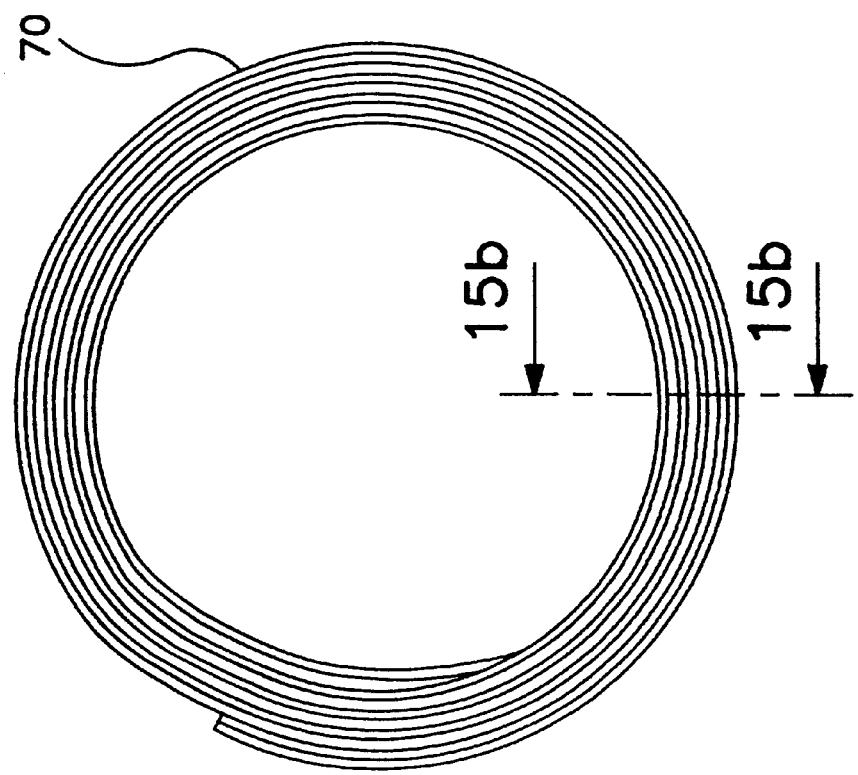
FIG. 15a is cross-sectional view of a tubular article in accordance with another embodiment of the present invention, said article constructed from a film comprising more than one material.
Figure 15B:
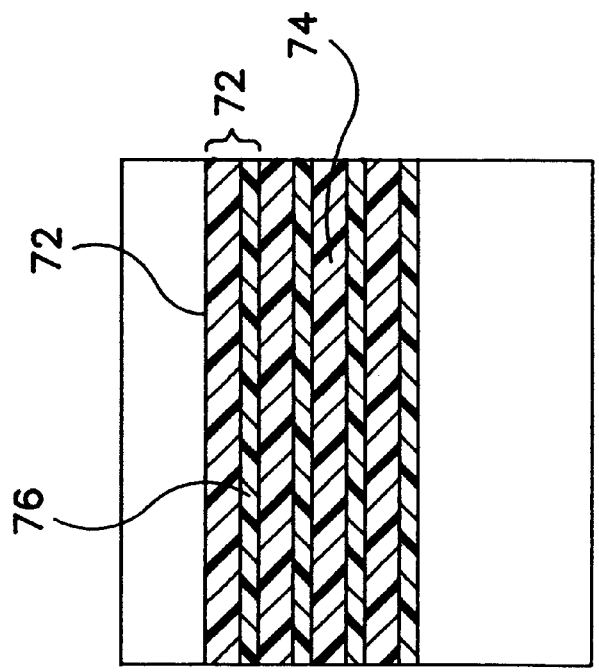

Those of skill in the art will realise that other constructions and forms of tubes may be produced, as illustrated in FIGS. 14 and 15. FIGS. 14a and 14b illustrate a tube 60 which has been formed by wrapping two sheets 62, 64 of different material around a mandrel. FIGS. 15a and 15b illustrate a tube 70 which has been formed by wrapping a sheet of material 72 around a mandrel. The sheet of material 72 is comprised of two materials 74, 76 bonded together, Either or both materials 74, 76 may be adhesive materials. Tubes may also be constructed from two or more sheet materials wrapped together around a mandrel. These sheet materials may or may not be bonded together.

Figure 16A:
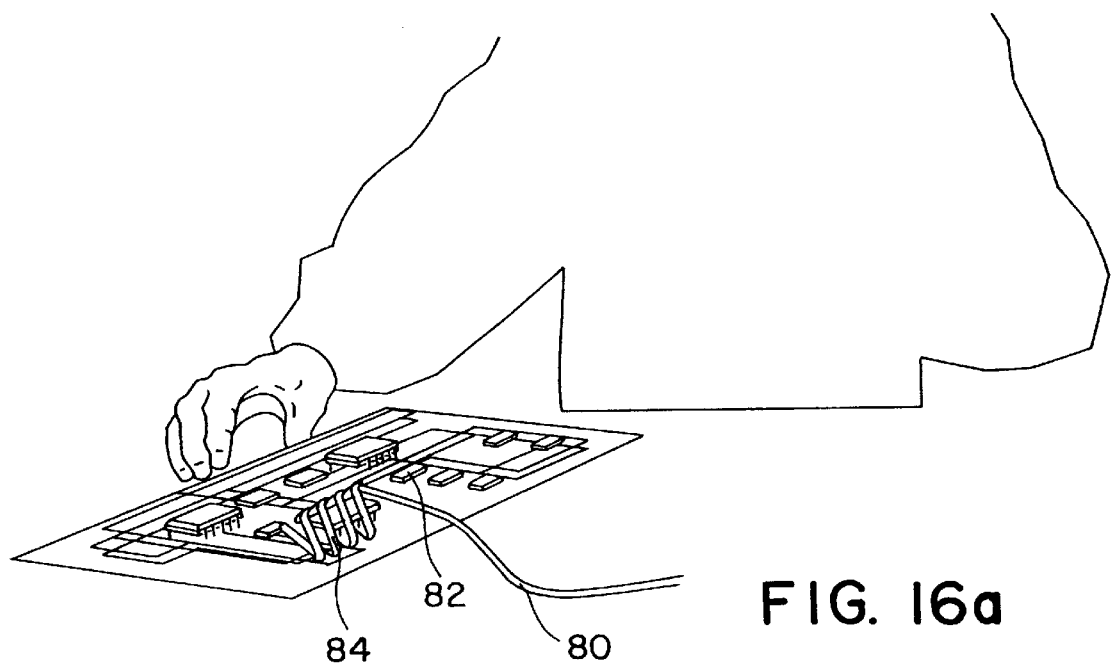
FIGS. 16a, 16b and 16c are diagrammatic illustrations of the use of articles of the present invention for cooling electronic devices.
Figure 16B:
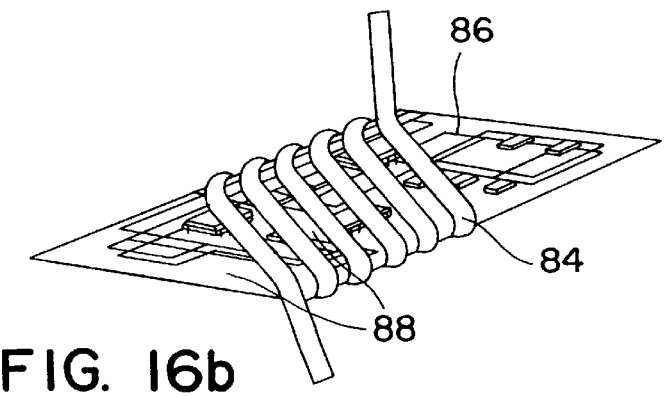
Figure 16C:
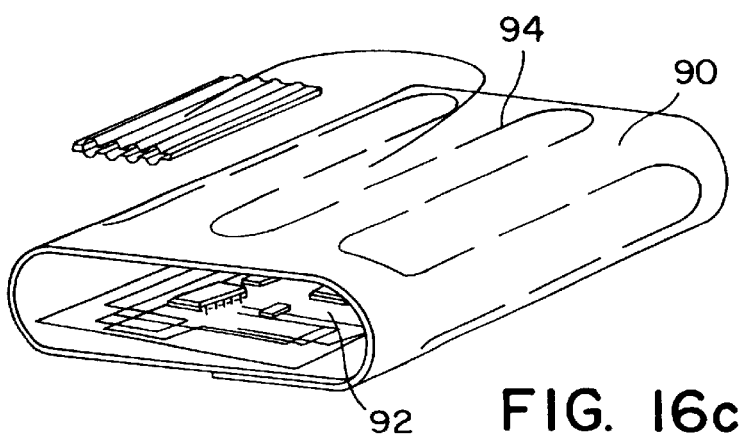

Further, tubes formed in accordance with embodiments of the invention may be used in a wide variety of transport, storage and cooling applications, and a number of possible cooling arrangements are illustrated in FIGS. 16a, 16b and 16c. In FIG. 16a, a tube 80 is shown passing around an individual component 82 mounted on a PCB 84. Alternatively, as illustrated in FIG. 16b, a tube 84 may be arranged to pass around a PCB 86 carrying a number of components 88. FIG. 16c illustrates a sheet 90, similar to that shown in FIG. 6, wrapped around a PCB 92, with conduits 94 formed between appropriate membrane sheets. In each of these arrangements, liquid nitrogen, liquid air, or another cryogenic fluid is passed through the tubes in liquid form, the tubes providing cooling by conduction from the "cold" tubes and by convection by the cold gas evaporating at or from the walls of the tubes.

Of course similar arrangements may be utilised in cooling other objects, including parts of the human body, engines, motors, electrical conductors and the like. Cooling arrangements may be provided for use by workers experiencing elevated temperatures in the course of their work, such as fire-fighters, miners working deep underground, operators in steelworks, racing car drivers and the like. Such cooling arrangements may also be of assistance to workers who must wear heavy or warm protective clothing. The consequential flow of gaseous fluid around the wearer's body may also assist in preventing or minimising the build-up of perspiration beneath the wearer's clothes, which may be waterproof or of a construction or arrangement which limits circulation of air. In these or other circumstances the arrangement may utilise liquid air and an arrangement for ensuring a supply of air reaches the wearer and thus provides a supply of cool air for breathing. Such cooling arrangements may also be of assistance in medical or veterinary applications, for example where it is useful for a patient's body, or part of a patient's body, to be cooled. In other applications, cooling sheets or enclosures may be utilised to facilitate storage of foodstuffs and other temperature sensitive supplies.

Articles may be produced in accordance with the present invention with a wide variety of possible designs and properties to suit particular applications. For example, specific design modifications that may be contemplated within the scope of the present invention include: providing a conduit that has various permeabilities along its length (for instance, regions ranging from permitting no liquid entry into the material to regions permitting liquid leakage through the exterior surface of the material); having conduits that have various permeabilities around their circumference, so that gas leakage occurs only at pre-determined places around the circumference; having modified segments along the conduit (e.g., being wider or narrower or having modified shapes, etc.) to provide specific delivery properties; etc.

While particular embodiments of the present invention have been illustrated and described herein, the present invention should not be limited to such illustrations and descriptions. It should be apparent that changes and modifications may be incorporated and embodied as part of the present invention within the scope of the following claims.

What is claimed is:

1. A garment incorporating a shaped article, said article comprising a polymer having a porous structure that restricts the passage of cryogenic fluid in the liquid phase while permitting the passage of cryogenic fluid in the gaseous phase.

2. The garment of claim 1 wherein the article comprises a material that has a thermal conductivity of about 0.1 Watts/m K or lower.

3. A garment incorporating a shaped article, said article having a porous structure and a liquid nitrogen leak pressure of greater than or equal to about 0.3 psi.

4. The garment of claim 3 wherein the article is flexible below 0° Celsius.

5. The garment of claim 4, wherein said article is flexible at cryogenic temperatures.

6. The garment of claim 5, wherein said article is flexible at about 77 Kelvin.

7. The garment of claim 4 wherein said article is comprised of a polymer.

8. The garment of claim 7 wherein the polymer is polytetrafluoroethylene.

9. The garment of claim 7 wherein the polymer is expanded polytetrafluoroethylene.

10. The garment of claim 7 in which said article comprises multiple layers of PTFE film.

11. The garment of claim 3 wherein the article is in the form of a tube.

12. The garment of claim 11 wherein said tube is comprised of a polymer.

13. The garment of claim 12 wherein the polymer is PTFE.

14. The garment of claim 12 wherein the polymer is expanded polytetrafluoroethylene.

15. The garment of claim 7 in which said article is comprised of PTFE and at least one other polymer.

16. The garment of claim 15 in which the other polymer is a copolymer of hexafluoropropylene and tetrafluoroethylene.

17. The garment of claim 15 in which the other polymer is a copolymer of tetrafluoroethylene and perfluoropropylvinyl ether.

18. The garment of claim 11 in which said tube is comprised of PTFE and at least one other polymer.

19. The garment of claim 18 in which the other polymer is a copolymer of tetrafluoroethylene and hexafluoropropylene.

20. The garment of claim 18 in which the other polymer is a copolymer of tetrafluoroethylene and perfluoropropylvinyl ether.

21. The garment of claim 11 in which said tube comprises multiple layers of PTFE film.

22. The garment of claim 11 wherein the tube further includes external reinforcement.

23. The garment of claim 3 wherein the article comprises a material that has a thermal conductivity of about 0.23 Watts/mK or lower.

24. The garment of claim 3 wherein said article has a LNLP of greater than or equal to about 0.45 psi.

25. The garment of claim 24 wherein said article has an LNLP between 0.003 and 0.075 Mpa.

26. The garment of claim 25 wherein said article has an LNLP between 0.04 and 0.06 Mpa.

27. A garment comprising: a conduit comprising a polymer material for carrying liquid cryogenic fluid into the interior of the garment; and connection means for connecting the conduit to a source of cryogenic fluid.

28. A garment according to claim 27 wherein the conduit comprises a material having a thickness and pore structure which permits the flow of cryogenic fluid through its thickness such that liquid cryogenic fluid enters one face of the material and gaseous cryogenic fluid exits the other face of the material.

29. The garment of claim 28 wherein the polymer is expanded polytetrafluoroethylene.

30. A garment according to claim 28 wherein the garment is in the form of a vest.

31. A garment of according to claim 28 wherein the garment is a waterproof garment.

32. A garment according to claim 28 wherein the garment is a whole body covering garment.

33. A garment according to claim 28 wherein the garment is a water resistant water vapour permeable garment.

34. The garment of claim 28 wherein the conduit includes external reinforcement.

35. A garment according to claim 27 wherein the polymer is a fluoropolymer.

36. The garment of claim 35 wherein the polymer is polytetrafluoroethylene.

37. The garment of claim 27 in which said conduit is comprised of PTFE and at least one other polymer.

38. The garment of claim 37 in which the other polymer is a copolymer of hexafluoropropylene and tetrafluoroethylene.

39. The garment of claim 37 in which the other polymer is a copolymer of tetrafluoroethylene and perfluoropropylvinyl ether.

40. The garment of claim 37 in which said conduit comprises multiple layers of PTFE film.

* * * * *